United States Patent

[11] 3,581,130

[72] Inventor Boris F. Grib
    Huntington, N.Y.
[21] Appl. No. 879,361
[22] Filed Nov. 24, 1969
[45] Patented May 25, 1971
[73] Assignee Philamon Incorporated
    Westbury, N.Y.
    Continuation-in-part of application Ser. No.
    743,445, July 9, 1968, now Patent No.
    3,480,809.

[54] COUNTERBALANCED RESILIENTLY SUPPORTED TUNING FORK
    9 Claims, 12 Drawing Figs.
[52] U.S. Cl. .................................................. 310/25,
    84/409, 84/457, 58/23, 318/128
[51] Int. Cl. ............................................... H02k 33/00
[50] Field of Search ......................................... 310/21, 72,
    25; 318/128, 132; 58/23, 23 (TF); 84/409, 453;
    331/156

[56] References Cited
    UNITED STATES PATENTS
    2,806,400  9/1957  Grib ............................ 84/457
    2,888,582  5/1959  Hetzel ......................... 84/409X
    3,316,708  5/1967  Waldburger .................. 58/23

3,480,809  11/1969  Grib ........................... 318/218X
    3,486,049  12/1969  Hetzel ......................... 310/25
    3,517,230   6/1970  Lewis et al. .................. 310/25

Primary Examiner—D. F. Duggan
Attorney—Darby & Darby

ABSTRACT: There is disclosed a tuning fork resonator with electrical drive and pickup coils and a tuning fork having a pair of tines, a common tine-junction section, a supporting portion for securing the fork in place and a pliant section between the common tine-junction portion and the supporting portion of the fork. The fork is provided with a counterbalance which is oppositely disposed from the tines of the fork with respect to the pliant section. The counterbalance counteracts the tendency of the tine ends to rotate in response to lateral acceleration force due to compliance of the pliant section and in some cases also counteracts the response to lateral acceleration force due to bending of the tines themselves. A version is disclosed in which there are two forks laterally spaced with the tine ends physically bridged together by shutters to form an elongated undulating aperture and with the counterbalance and common tine-junction portions of the two forks consisting of a common bridging structure which is relatively rigid so that the two pairs of tines of the respective fork sections are substantially in unison both as to tine vibrations and as to reaction to acceleration forces.

PATENTED MAY 25 1971

INVENTOR.
BORIS F. GRIB

BY Darby & Darby

ATTORNEYS

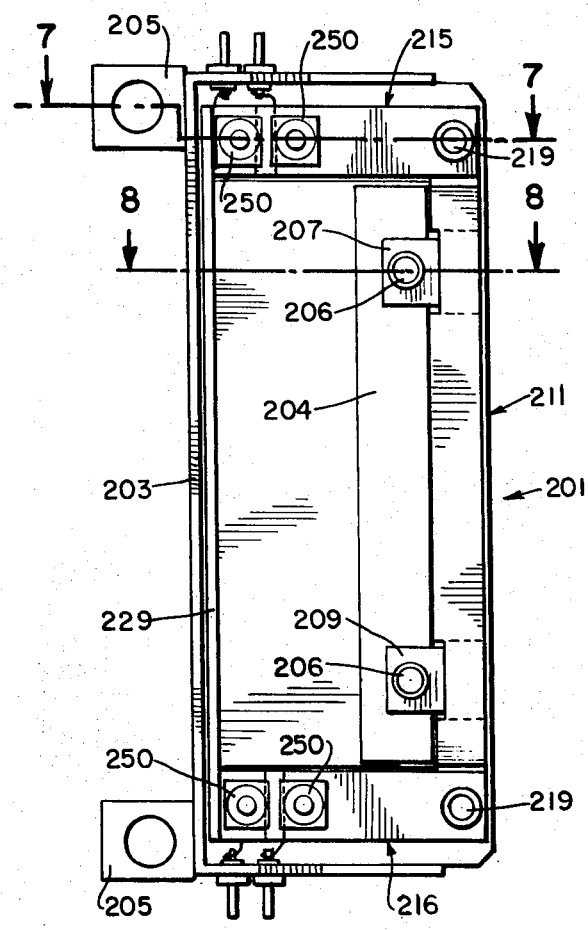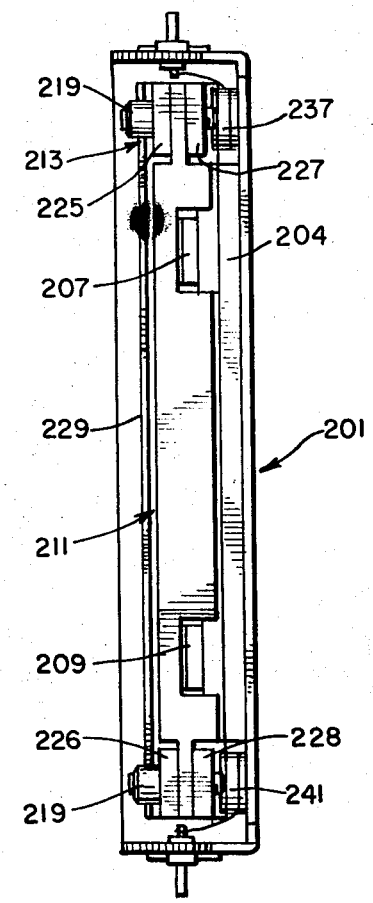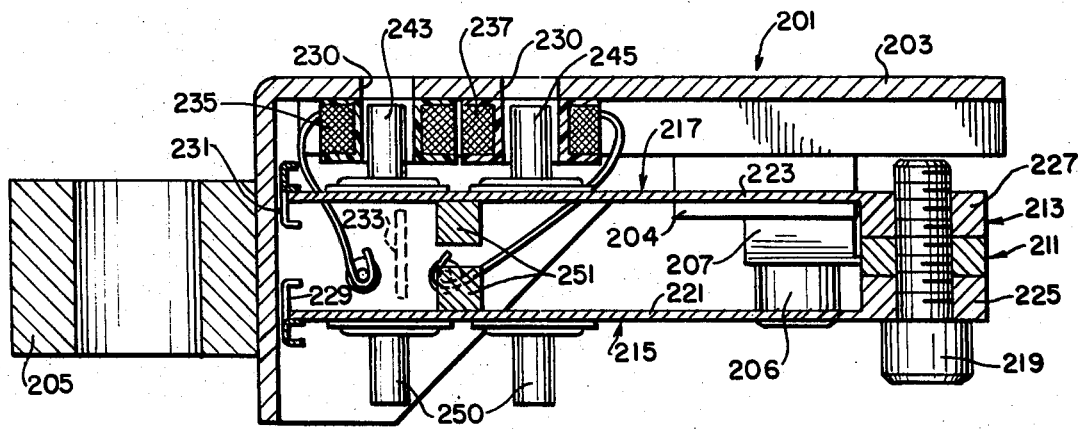

INVENTOR.
BORIS F. GRIB
BY Darby & Darby
ATTORNEYS

COUNTERBALANCED RESILIENTLY SUPPORTED TUNING FORK

This application is a continuation-in-part of prior copending Boris F. Grib application Ser. No. 743,445 for tuning fork resonator with feed mode damping and reed signal cancellation, filed July 9, 1968, now U.S. Pat. No. 3,480,809.

Tuning fork resonators are commonly used both as a highly selective filter for electrical signals or in conjunction with a feedback amplifier to provide a very stable oscillator. In any application of a tuning fork resonator it is desirable to exploit the advantages of the fork-mode vibration of the tuning fork and to suppress all effects stemming from the reed-mode vibration of the tuning fork. This is a well established principle in my prior patent applications, for example, application Ser. No. 599,522, now U.S. Pat. No. 3,425,310 filed Dec. 6, 1966, entitled Balanced And Coupled Tuning Fork Mounting Structure For Suppressing Reed Vibration, in the names of Boris F. Grib and Robert R. Shreve.

As explained in my prior applications and patents in more detail, the tuning fork resonator fork-mode vibration consists of the tines of the fork simultaneously moving toward each other and then away from each other in "perfect mirror image" synchronism.

For the purpose of this discussion the tuning fork is assumed to have a common tine-junction structure which is effectively rigid as opposed to the tines which must be at least in part compliant.

The tines can be envisioned as a pair of side-by-side cantilever beams joined together at the end opposite their free end. During fork-mode vibration, the "tine-cantilevers" provide for each other a common opposing fulcrum and a common opposing moment arm against which the tines can be opposingly rotated. If the tines are equal as to stiffness, mass, and deflection, the opposing forces imparted to the common tine junction are equal and opposite and thus do not tend to produce any lateral motion of the common tine junction. It will be seen that if the tine portion and the common tine-junction portion of a fork is not mounted to anything but is effectively floating freely, it will only be possible for the tines to vibrate in the fork mode as they would only have each other as a means to create the necessary restoring forces required for sustained harmonic vibratory motion. Since the action and reaction in a system must be equal and opposite, the motions of the tines in the hypothetical situation described must be equal and opposite and thus represent perfect fork-mode vibration.

Practical forks do not have their common tine junction completely unrestrained as in the foregoing hypothetical case. Nevertheless, the above-described mutual reactions of the vibrating tines is responsible for the predominance of fork-mode vibration in fork structures. In fact, if one were to totally constrain the common tine-junction portion of a fork, there would be no effective coupling between the tines of the fork and each tine could vibrate essentially as an independent reed since each tine could create separate independent restoring forces against the inertia of the constraining mount. In such a case, the inevitable slight difference in the frequency of the vibration of the independent tines would cause their phase relationship to constantly change and no sustained fork-mode vibration would exist.

In order to avoid the deleterious effects of undue constraint on the common tine-junction area of a fork, it is known to be desirable to introduce a pliant portion between the common tine junction of the fork and the heel of the fork as illustrated in U.S. Pat. No. 2,806,400 and others.

The pliant section serves several functions. For example, it reduces the amount of lateral vibration that would otherwise be transmitted to the heel and mounting base due to unbalance of the tines, which unbalance is not entirely avoidable. When the tines are not in balance, the opposing forces at the common tine junction are not exactly equal, resulting in a net lateral force. The compliance of the pliant section is such as to provide lateral motion compliance of the tine-junction area relative to the heel and mounting base for the fork; this minimizes fork energy losses in the base mount and contributes toward maximal fork resonator Q.

The pliant section also acts as a shock and vibration isolator in that it mechanically decouples the common tine junction from the heel and mounting base. In other words, if the mounting base and tuning fork heel are exposed to a given lateral shock or vibration, something less than this shock or vibration will be imparted to the centers of mass of the tines.

Furthermore, to the extent that the tines are in balance, any shock or vibration imparted to their centers of mass will not be in such phase as to create differential "fork-mode" forces on the tines, but will tend to cause the tines to move in the same direction thus not interfering with the normal "fork-mode" vibration of the tines. Thus the pliant section permits the fork tines to be displaced by shock or vibration by deflecting together in the same lateral direction while the "fork-mode" vibrations continue without significant interference.

It is important to again emphasize a very basic function of the pliant section in assuring a heavily predominant or fork-mode vibration as compared to "twin reed" vibration. The pliant section assures that there is not excessive rigidity in the mounting of the common tine junction; hence, even though the tines are not perfectly balanced and are not uniformly excited, they are nevertheless coupled to vibrate in unison in the fork-mode and not independently as individual reeds.

The use of a pliant section or its equivalent between the common tine junction and the fork mounting heel is essential to provide the above-described desirable performance functions. The less the stiffness of the pliant section (as compared to individual tine stiffness) the greater degree of improvement in the desirable performance function. This assumes that the masses remain the same.

The pliant section, however, introduces an additional lateral restoring force and mass combination thus creating a dynamic undesired lateral (reed) resonant frequency of vibration. The reed resonant frequency herein referred to will be determined by a number of factors including the combined mass moments of inertia of the tines and common junction and by the stiffness of the pliant section. Obviously the resonant frequency of each individual fork tine (which corresponds to the fork-mode resonant frequency) is a function of the stiffness of each tine and its mass moment of inertia.

Experimentation and practical experience has shown that the three desirable functions of the pliant section are performed fairly satisfactorily when the reed resonant frequency is set at a value at least slightly below 100 percent of the fork-mode resonant frequency. The performance improves markedly as the percentage is reduced and continues to improve even as the reed frequency as a percentage of fork-mode frequency is reduced below 75 percent. The lower limit for this percentage has been determined by the maximum lateral reed deflection tolerable under the maximum anticipated lateral shock or vibration.

The present invention permits maximum utilization of the desirable characteristics of the pliant section at the same time minimizing its detrimental aspects. As previously mentioned, one limitation on the amount of compliance that may be provided by the pliant section is the amount of deflection of the ends of the tuning fork which can be tolerated considering the acceleration forces which the apparatus must withstand. One straightforward technique for preventing an intolerable amount of deflection of the ends of the tines is, of course, to reduce the amount of compliance in the pliant section. However, this reduces the effectiveness of the pliant section particularly as the compliance is reduced to where it is less than half that of the individual fork tines; in such case, the reed frequency of vibration of the tines jointly due to compliance of the pliant section is nearly as great as the fork frequency of vibration of the tines. The lower the fork frequency of a particular design the greater is the problem involved here.

The present invention provides a different approach which most importantly preserves and in fact enhances the efficacy of the pliant section but at the same time greatly ameliorates the problem of undesired fork tine deflection in the presence of acceleration forces. It should be pointed out that the techniques according to the invention are largely ineffective or even undesirable as respects sensitivity to angular accelerations. Fortunately, angular accelerations present inconsequential problems as compared with the problems arising from linear (lateral) accelerations to which the fork is subjected. It is sufficient, therefore, to take reasonable care that the fork is not subjected to exceptionally large angular accelerations.

As previously explained, the previous practice in regard to the pliant section of the tuning fork and the deflection of the fork tines due to bending of the pliant section has been simple to tolerate the bending and assure that the compliance of the pliant section is not great enough to permit unacceptable deflection of the common tine-junction section and the tines. Attempts have been made to damp the tuning fork so that sustained vibrations of the structure in a reed mode by reason of bending of the pliant section would not be a severe problem. Damping is not an optimum solution to the problems, however, as excessive damping interferes with the basic advantages of the pliant section of the tuning fork.

The present invention attacks the problem of reed mode deflection and vibration due to linear acceleration forces by counterbalancing the tuning fork structure in such a way that lateral acceleration forces produce very little deflection of the fork tine ends. This is accomplished by placing a mass substantially rigidly connected to the common tine-junction area on the opposite side of the pliant section from the fork tines mass. The moment which would otherwise be applied to rotate the fork about the pliant section in the presence of lateral acceleration is greatly diminished.

In some cases, the most appropriate design will be to seek to minimize the moment tending to rate the fork about the pliant section in the presence of lateral acceleration. In other cases, however, it will be desirable to overbalance the tuning fork tines with a slightly greater mass moment on the counterbalance side of the pliant section. In this way, the bending of the tines themselves will also be offset by rotation of the common tine-junction area due to slight counterbending of the pliant section. It will be understood throughout that while the pliant section is often spoken of as bending, the deflection about the pliant section may take the form of rotation of a shaft in a bearing or torsional deflection of a rod or other equivalent forms.

Accordingly, it is an object of the present invention to provide a tuning fork structure including a counterbalancing mass substantially counteracting the deflection of the tuning fork tines about a pliant section of the fork in the presence of lateral acceleration.

It is a further object of the invention to provide a counterbalanced tuning fork structure wherein the counterbalance effect is achieved primarily by the addition of mass to the structure and no more than minimally by the placement of the fork pliant section near to the line joining the centers of mass of the fork tines.

Other objects and advantages in addition to those described above will be apparent from consideration of the following description in conjunction with the appended drawings, in which:

FIG. 5 is a plan view of a double fork structure illustrating the application of the present invention to such a structure;

FIG. 6 is an elevational view of the apparatus of FIG. 5;

FIG. 7 is a sectional view of the apparatus of FIG. 5 taken along the line 7—7 in FIG. 5;

Figure 1:
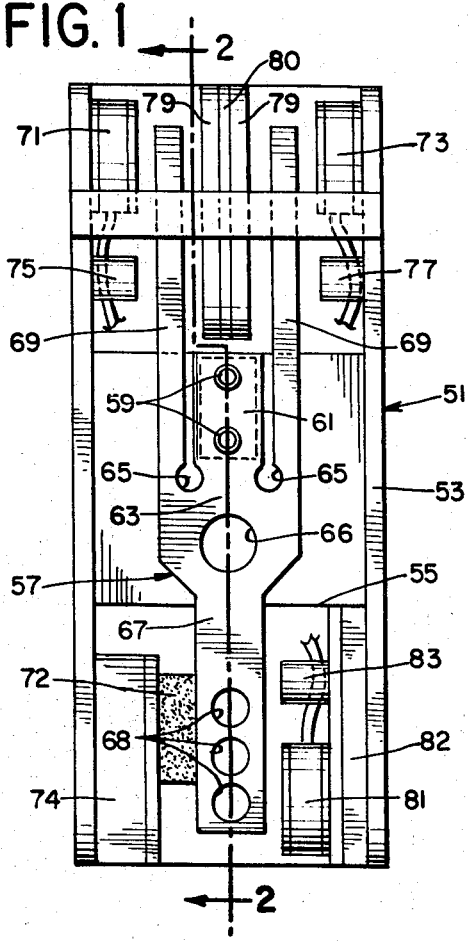
FIG. 1 is a plan view of one form of tuning fork structure embodying the principles of the invention.

The invention will be described with reference to the drawings and first in particular with reference to FIGS. 1 and 2.

Tuning fork 57 is mounted to platform 55 and base 53 by appropriate means such as bolts 59. Fork 57 includes a heel-supporting portion 61, a pliant portion 63, a common tine-junction portion 67 and a pair of tines 69.

Figure 2:
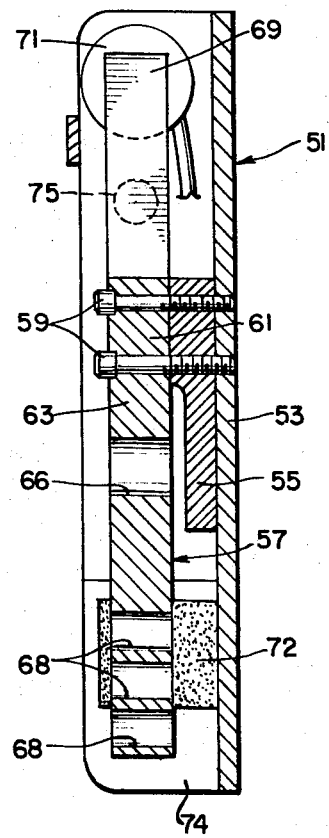
FIG. 2 is a sectional view of the apparatus of FIG. 1 taken along the line 2—2 in FIG. 1.

In the structure of FIGS. 1 and 2, it will be noted that an extension of the common tine-junction portion 67 in a direction opposite to the extension of tines 69 makes it convenient for the heel support portion 61 to be located between the fork tines 69. Such mounting arrangements are well known and do not affect the operation of the fork itself for purposes of the present explanation.

The constricted portion of the structure forming pliant section 63 may conveniently be provided by the appropriately dimensioned holes 65 made by conventional machining operations.

Appropriate holes 66 and 68 may be provided to create the desired mass distribution in the common tine-junction portion of the fork structure while maintaining its rigidity. It may be desirable to approximately equalize the mass moment of the common tine junction portion including the counterbalance extension relative to that of the fork tines as will later be explained.

Coils 71 and 73 and magnets 75 and 77 are provided as substantially conventional drive and pickup elements. Magnetic shielding barriers 79 and a separator 80 are also provided in accordance with previously known techniques.

A reed cancellation coil 81 is provided near the common tine-juncton portion most remote from the pliant section 63 adjacent which is placed a magnet 83. It is possible to locate coil 81 with respect to the pliant section 63 to generate an electrical signal which corresponds to any reed frequency vibration of the fork 57 and is relatively unaffected by fork-mode vibrations of the fork 57.

Thus by combining the signal of coil 81 with the signal from a generally conventional pickup coil 73, it is possible to obtain a signal in which the fork reed-mode vibration components are effectively cancelled due to the opposite sense of such signals in coil 81 as compared with coil 73. This achieves the desired result of obtaining an electrical signal which depends solely upon the fork-mode vibrations of fork 57 and is relatively unaffected by any reed-mode vibrations.

Reed-mode vibrations are on occasion electrically introduced by input signals in drive coil 31 corresponding to the reed-mode vibration frequency. As to such source of reed-mode vibrations, it would be effective to connect a reed cancellation coil similar to coil 81 as a drive coil in opposition to drive coil 71. In this fashion, forces tending to produce reed-mode vibrations due to the input signal to the tuning fork resonator would be effectively cancelled. Cancellation could be provided both in the input or drive circuit and in the output or pickup circuit at the expense of possibly increasing the problem of direct electromagnetic coupling between input and output.

It should be noted that, once having a transducer coupled to the fork only for the reed-mode of vibration, it is possible to suppress reed vibrations in numerous ways. As a further example, one may use the reed-coupled coil to generate a signal corresponding to reed vibration which may then be amplified and supplied to the fork drive coil (or a special drive coil) with a phase relationship that suppresses the reed vibration. It will be noted that in the apparatus of FIGS. 1 and 2, the cancellation coil 81 is located substantially equally distant from the pliant section 63 as is the pickup coil 73 and drive coil 71. Thus, approximately equal changes in air gap will be expected at the respective coils and the respective coils may be approximately equally effective in converting displacements or changes in air gap to electrical signals or vice versa.

A support 82 is provided to properly support coil 81 and magnet 83 at the proper spacing from the outward extension of common tine-junction portion 67.

On the opposite side of the base from coil 81 a damping element 72 may be provided which may also be supported by a support structure 74. An advantage is derived from the apparatus of FIGS. 1 and 2 due to the fact that the masses of the tines 69 and the common tine-junction portion and extension 67 are oppositely disposed about the pliant section 63, thus diminishing the bending of pliant section 63 due to lateral shock or vibration.

Figure 3:
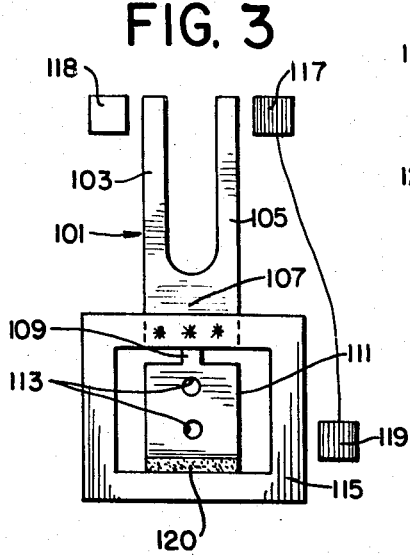
FIG. 3 is a schematic illustration of a tuning fork structure of an alternative form embodying the invention.
Figure 4:
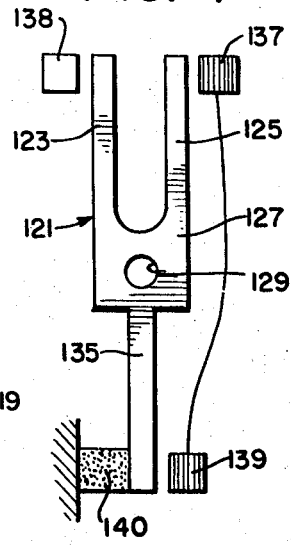
FIG. 4 and FIG. 4A are schematic illustrations of an alternative form of fork embodying the invention similar to that illustrated in FIGS. 1 and 2 but with a different form of pliant section.
Figure 4A:
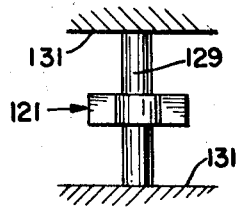
Figure 8:
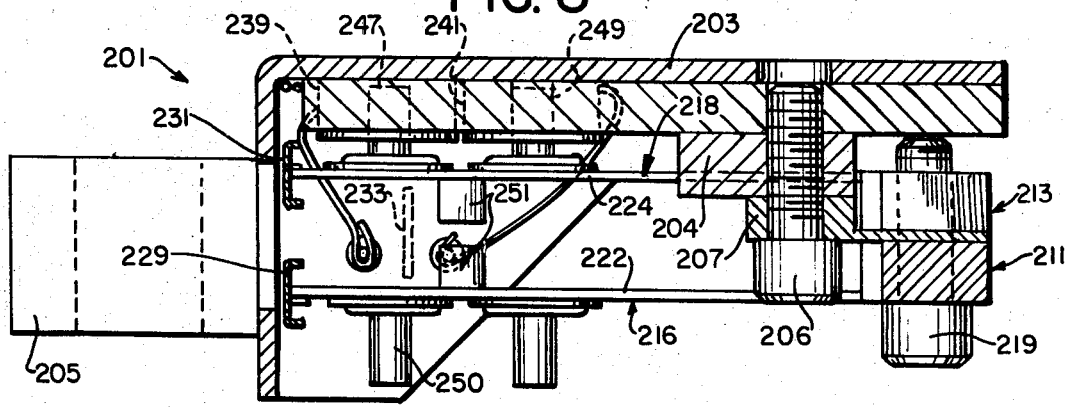
FIG. 8 is a sectional view of the apparatus of FIG. 5 taken along the line 8—8 in FIG. 5.

FIGS. 3, 4 and 4A illustrate schematically alternative versions of tuning fork structures which embody the present invention.

FIG. 3 differs from the apparatus of FIGS. 1 and 2 previously described in that the tuning fork is of a more common type which is mounted by means of a supporting (heel) portion extending on the side of the common tine-junction portion opposite the fork tines.

In FIG. 3 a fork structure 101 is shown having a pair of tines 103 and 105. The tines 103 and 105 are formed integrally with a common tine junction portion 107. The common tine junction portion 107 is resiliently supported by a web 109 which may or may not be formed integrally with the common tine-junction portion 107. The web 109 is secured to a fork support 111 which is in turn mounted on the fork base (not shown). The fork support portion 111 is rigidly secured to the fork base by suitable means such as bolts 113.

It can readily be seen that the portion of the FIG. 3 structure thus far described is heavily unbalanced with respect to the resilient web 109, and if exposed to lateral acceleration forces (i.e. from right or left as illustrated in FIG. 3) there would be substantial bending of web 109 and displacement of tines 103 and 105 as a result.

In accordance with the invention, a counterbalance structure 115 of boxlike configuration is rigidly secured to the common tine-junction portion 107 of the fork 101 by spot-welding or other suitable procedure. The counterbalance structure 115 is shaped and dimensioned and formed of material such that it is relatively rigid, as compared for example with web 109 or tines 103 and 105.

Furthermore, the counterbalance structure 115 is preferably designed to have a mass moment relative to the resilient web 109 approximately equal to that of the common tine-junction portion 107 and tines 103 and 105.

Accordingly, when the fork 101 is exposed to lateral acceleration forces, the tuning moment applied to the common tine-junction portion 107 tending to cause it to rotate about an axis located substantially at resilient web 109 may be greatly diminished. For example, the unbalanced or net mass moment about web 109 can readily be reduced to the point where it is less than one-tenth the mass moment which would exist in the absence of counterbalance structure 115.

In a further refinement of the design of structures according to the present invention, the bending of tines 103 and 105 can be taken into account and largely counteracted. Note, for example, that if the mass moment of counterbalance structure 115 is adjusted to completely eliminate any rotational motion of common tine junction portion 107 due to bending of web 109, there would still be displacement of tines 103 and 105 in the fork mode due to bending of the tines themselves. Therefore, in some cases, especially for quite low frequency forks, it will be desirable to overbalance the tine portion of the fork slightly with the counterbalance structure 115. In such case, there will be a slight bending of web 109 in a sense opposite to that which would occur in the absence of counterbalance structure 115. There will be a corresponding slight rotation of common tine-junction portion 107 which may be designed to very nearly counteract the displacement of the ends of the tines 103 and 105 due to the tines' own bending in response to acceleration forces. This is explained more fully with reference to FIG. 11.

The apparatus illustrated schematically in FIG. 3 may be provided with conventional drive and pickup coils 117 and 118 respectively. It may be particularly desirable to provide a counteracting drive coil 119 situated and designed to apply a force on the counterbalance structure 115 equal and opposite to drive coil 117. It may be sufficient if coil 119 is tuned to apply such force only at or near (reed) resonant frequency of the entire structure for vibration about the web 109 (in a rotational mode).

It may also be desirable to provide a small degree of damping for the reed mode vibration of the entire apparatus. This may conveniently be provided by a damping element 120 of glassy material such as rubber or plastic foam secured between fork support portion 111 and counterbalance structure 115. Any other suitable mechanical fluid or electrical damping means any alternatively be used or in some cases damping may be unnecessary.

From the foregoing description and explanation, it will be appreciated that the invention as schematically illustrated in FIG. 3 is particularly effective in reducing the most deleterious effects of shock and vibration on a fork resonator apparatus without requiring a reduction in the compliance of the web 109 (or other equivalent pliant section).

FIGS. 4 and 4A show the application of the invention to another form of tuning fork structure. In FIGS. 4 and 4A, the pliant section of the fork structure is neither on the tine side of the common tine junction portion nor on the opposite side of the common tine junction portion but effectively passes through the middle of the common tine junction portion.

A fork structure 121 includes a pair of tines 123 and 125. The tines 123 and 125 are formed integrally with the common tine junction portion 127. The common tine junction portion 127 is resiliently supported by a torsion bar 129. The torsion bar 129 is rigidly attached at its central portion to fork 121 and is also rigidly attached at its ends to a base structure 131 as shown schematically in FIG. 4A. A counterbalance structure 135 of elongated configuration is formed integrally with common tine-junction portion 127 or is otherwise rigidly secured thereto. The counterbalance structure 135 is designed with appropriate mass to counteract effects of lateral acceleration forces as previously described with reference to FIG. 3. As seen in FIGS. 3, 4 and 4A, the fork pliant section may take widely varying forms and still other forms of pliant sections may be used in apparatus according to the invention.

The apparatus illustrated schematically in FIG. 4 may also be provided with conventional drive and pickup coils 137 and 138 respectively. As explained with reference to FIG. 3, it may also be desirable to provide a counteracting drive coil 139 for fork 121. A damping element 140 may also be provided in the apparatus of FIG. 4.

The fundamental principles previously described and explained are applicable to a wide variety of fork structures. The application of these principles to an unusual fork structure is illustrated in FIGS. 5, 6 and 7 (in enlarged scale). Referring to these FIGURES, a fork resonator 201 is shown having a base 203 adapted to be rigidly secured in place by means of lugs 205. Rigidly secured to the base 203 is a support member 204. In turn, rigidly secured by machine screws 206 to the support member 204 are two web members 207 and 209.

The web members 207 and 209 in at least one portion thereof are thin and flexible, thus serving in conjunction as a pliant section for the fork resonator structure.

Rigidly attached to the free flexible ends of web elements 207 and 209 is a common tine-junction element 211. Common tine-junction element 211 forms part of the common tine-junction portion of a double fork structure 213.

Double-fork structure 213 is preferably made in the form of a composite fork structure as more fully described in copending application Ser. No. 839,928, filed July 8, 1969, in the name of Boris F. Grib. Four composite fork tine units 215, 216, 217 and 218 are rigidly secured to common tine-junction element 211 by machine screws 219 or other suitable means. It will be noted that tine units 215, 216, 217 and 218 have tine portions 221, 222, 223 and 224 and base portions 225, 226, 227 and 228 formed integrally from one unitary piece of metal. As more fully explained in the above-identified prior copending application, this structure facilitates precise balancing of the tines and avoids stress failures at the base of the tines.

At the free ends of tine units 215, 216, 217 and 218, there are mounted a pair of shutter elements 229 and 231. Shutter element 229 is mounted and bridges between tine unit 215 and tine unit 216 while shutter element 231 is mounted to and bridges between tine unit 217 and tine unit 218. Shutter elements 229 and 231 may, as shown, be formed with L or U cross sections to increase the rigidity of shutters 229 and 231 while avoiding undue addition of weight in these elements.

From the description of the structure of FIGS. 5, 6 and 7 thus far presented, it will be seen that a double fork structure is provided such that the ends of the tines of the two forks are respectively bridged with shutter elements providing an elongated aperture defined by shutters mounted to vibrate at the resonant frequency of the combined tuning fork and shutter structure.

The purpose of the apparatus illustrated in FIGS. 5 through 8 is to provide an accurately determinable amplitude modulation of a light beam passing through an elongated aperture. The optical portions of the apparatus have been omitted for simplicity, but to aid in understanding of the purpose of the structure it may be pointed out that a mirror indicated schematically in dashed lines at 233 permits a light beam to be transmitted in between shutters 229 and 231 and reflected back out again so that the vibration of the shutters 229 and 231 amplitude modulates the energy of the beam at the inherently stable frequency of the double fork resonator structure. Coils 235, 237, 239 and 241 are provided to drive and control the vibrating fork structure.

Conventional drive techniques may be used for the structure whereby the resonance frequency is essentially determined by physical characteristics of the fork structure. In such case, coils 235 and 239 may be drive coils while coils 237 and 241 may be pickup coils. Various other forms of drive and control are known or may be devised for the apparatus, and the particular form of drive and control does not form a part of the present invention. Care should be taken that the two forks are driven in unison as they will resonate in an unwanted mode if driven in opposition.

Permanent magnets 243, 245, 247 and 249 are mounted on the fork tines (upper tines as shown in FIG. 7) to cooperate with coils 235, 237, 239 and 241 in conventional manner for drive and/or control of the tuning fork apparatus. If necessary, the base 203 may be provided with appropriate openings 230 to accommodate the excursions of the permanent magnets.

Additional permanent magnets 250 are utilized solely for physical balance of the structure. However, magnets 250 could also be provided with drive and/or pickup coils if it was desired to drive or pick up from all tines of the structure rather than only from the upper tines as in FIGS. 5 through 7.

In the apparatus of FIGS. 5 through 7, the desired frequency (on the order of 150 Hz.) is quite low and the tines accordingly are quite flexible. In the presence of longitudinal acceleration forces (along the direction of the length of the tines) there would be a tendency to bending of the tine due to the unbalanced orientation of the permanent magnets. Accordingly, balance weights 251 are provided substantially eliminating this problem.

The apparatus of FIGS. 5 through 8 has the counterbalance feature previously described with reference to FIGS. 1 through 4A. It will be noted that the common tine-junction element 211 and to some extent other portions of the structure such as tine bases 225, 226, 227 and 228 and machine screws 219 furnish a counterweight mass such that the tendency of the ends of the tines to deflect upon exposure of the apparatus to lateral acceleration forces is substantially counteracted by the tendency of the tines to be displaced in the opposite direction due to the bending of the pliant web as a result of acceleration forces acting on the mass of the counterweight. In the apparatus of FIGS. 5 through 8, the counterweight mass is adjusted so that there is minimal displacement of the shutters 231 and 229 upon exposure to lateral acceleration forces (from top or bottom in FIG. 7 or 8). This mass adjustment can very easily be accomplished by observing any displacement due to the acceleration of gravity as the structure is rotated in the gravitational field to change the direction or magnitude of the lateral acceleration force due to gravity. Observed displacements due to change in lateral acceleration force can be minimized by increase or decrease in the mass of the counterweight portion of the structure.

It will be seen, therefore, that the fork resonator structure for optical modulation illustrated in FIGS. 5, 6, 7 and 8 is rendered relatively immune to lateral acceleration forces notwithstanding the substantial compliance of the pliant web portion of the structure. Thus, a fork resonator of overall high-performance characteristic is provided at an unusually low resonant frequency.

It should further be noted that the counterweight feature of this apparatus is effective to minimize the physical manifestations of reed-mode displacement or reed-mode vibration due to lateral acceleration forces. This is essential in such apparatus since it is the physical displacement of the fork tine ends which is relied upon to modulate a light beam. Previous approaches to suppressing the effects of reed-mode vibration frequently relied upon cancelling the reed-mode contribution in the electrical signals which were generated; however, such approaches did nothing to suppress the actual physical displacement itself. In apparatus as illustrated in FIGS. 5 through 8, it is obviously necessary to suppress the physical displacement itself.

Figure 10:
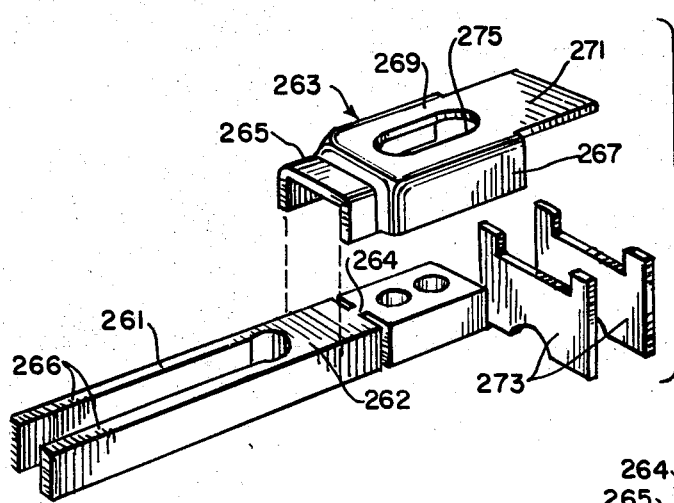
FIG. 10 is an exploded perspective view of the fork structure of FIG. 9.
Figure 9:
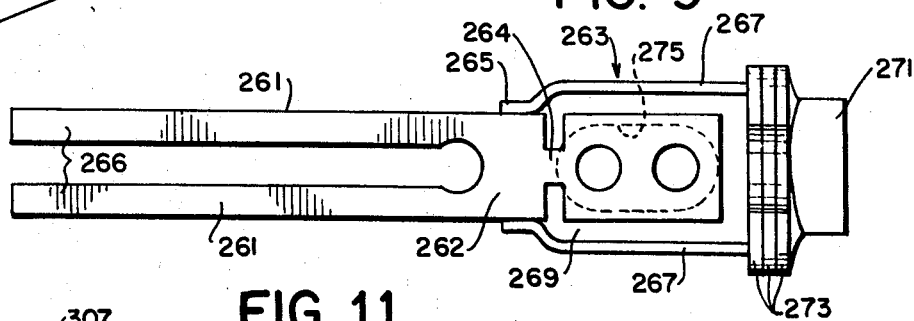
FIG. 9 is a plan view of an alternative form of tuning fork structure of a type similar to that shown schematically in FIG. 3.

FIGS. 9 and 10 illustrate a practical embodiment of a fork structure generally of the type illustrated schematically in FIG. 3. A fork 261 which may be of conventional form is provided with a counterweight box structure 263 which includes a neck portion 265, sidewalls 267, top portion 269, and rearward extension 271. Counterweight box structure 263 is secured by welding or soldering at neck 265 to the common tine-junction portion of fork 261.

The channel-shaped cross section of the counterweight 263 creates a rigid and relatively light structural member. WEights 273 are secured to the rearward extension 271 by soldering or other suitable fastening procedure so that a substantial counterbalancing mass moment can be provided for the common tine junction portion 262 of the fork 261. This mass moment is on the opposite side of web 264 from the fork tines 266 and adjusted to the desired value by the addition of the appropriate number of weights 273 supplemented by the weight of additional solder material. The appropriate balance between counterweight 263 and fork tines 266 can thus be assured. Counterweight 263 is preferably provided with an opening 275 to give access to machine screws or other fasteners utilized to secure the fork in position.

Figure 11:
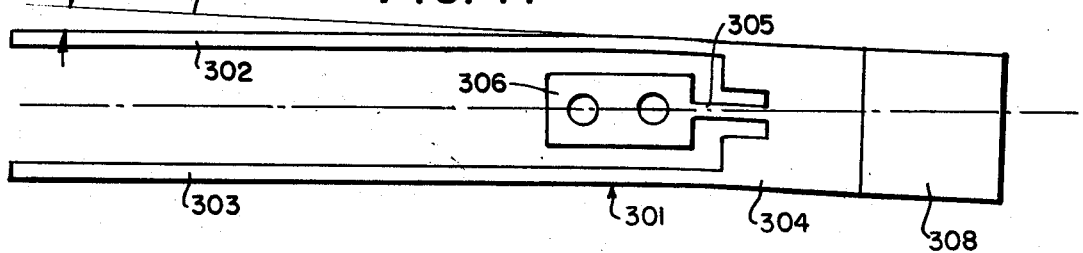
FIG. 11 is a schematic illustration of a fork structure showing the bending representative of that encountered due to lateral acceleration forces and the way in which such bending may be apportioned to counteract the tendency of the ends of the fork tines to deflect.

FIG. 11 illustrates the manner in which any of the counterbalance fork structures previously described and illustrated in FIGS. 1 through 10 may be designed to be slightly overbalanced in the counterweight end to compensate for deflections of the fork tines themselves.

FIG. 11 illustrates a fork structure being exposed to a lateral acceleration force. The acceleration force is directed downward on the counterweight portion of the fork and the fork tines. In FIG. 11, the fork 301 has a pair of tines 302 and 303 joined in a common tine junction portion 304 which has rigidly secured thereto a counterweight 308. The common tine junction portion 304 is connected by a pliant web 305 to the supporting portion 306 of the fork.

For simplicity in FIG. 11, it is assumed that with respect to fork mode vibration, the tines are in the zero displacement position. There exists, however, a situation in which the tines would tend to be displaced, as in shock by a lateral acceleration force. It will be noted that tine 302 is bent from its rest relation with common tine-junction portion 304 as indicated by line 307. The angle of bending is designated A as indicated by the arrows near the end of tine 302.

It will also be noted that web 305 is bent, causing a rotation of common tine-junction portion 304 of the fork. The amount of bending of web 305 is in direct relation to the mass moment operative thereon including the counterweight 308. As illustrated, the mass moment of the counterweight 308 exceeds the oppositely disposed mass moment of the tuning fork tines by an amount sufficient to bring about slight bending of web 305. Due to bending of web 305, there is a rotational displacement of common tine-junction portion 304, and as shown in FIG. 11 this rotational displacement is just sufficient to counteract the bending of tine 302 (and of course tine 303 as well).

In many instances, it may be quite desirable to adjust the mass of counterweight portion 308 to thus counteract the bending of tines 302 and 303 rather than to provide a balance such that the bending of the web 305 is minimized.

It should be noted that one has two alternatives in achieving approximate balance in the fork structure about an axis through the pliant section of the fork. One alternative is to add mass and locate the mass with respect to the pliant section so as to balance (or slightly overbalance) the mass of the tines and other essential fork elements. This is the alternative represented by the present invention.

The other alternative is to displace the pliant section axis to a point near the center of gravity of the fork structure (without any counterweight). This is not in accord with the present invention as it destroys the effectiveness of the pliant section by placing the pliant section axis near the line joining the center of mass of the tines. The effectiveness of the pliant section depends on its permitting highly compliant response of the common tine junction to reaction forces of the individual tines.

If the center of mass of the tines is located lengthwise of the fork at substantially the same position as the pliant section axis, there is little or no lever arm for the tine mass relative to the pliant section axis so that the pliant section is effectively very stiff as respects reaction forces of the tines.

Accordingly, moving the location of the fork pliant section (rather than counterweighting the fork) is self-defeating and does not accomplish the objects of the present invention. As a rule of thumb the pliant section (reed-mode) axis of the fork should be at least approximately one-quarter tine-length displaced from the line joining the tines' centers of gravity.

From the foregoing explanation, it will be seen that the present invention provides features whereby fork resonator structures may be rendered relatively immune to lateral acceleration forces. This immunity is provided in respect to the actual physical displacement of the ends of the fork tines and not merely in terms of cancellation of signals generated by combined movement of both tines.

The present invention is subject to numerous variations and modifications by those skilled in the art, and accordingly the scope of the invention is not to be deemed to be limited to the particular embodiments or variations shown or suggested but is to be determined by reference to the appended claims.

What I claim is:

1. A fork resonator comprising a fork having a pair of tines, a common tine-junction portion, a mounting portion secured to a base, a pliant coupling section connecting said common tine-junction portion with said mounting portion so that said common tine-junction portion is vibratable in a reed-mode about a predetermined reed-mode axis, the center of gravity of the combination of said tines and said common tine-junction portion being substantially as far from the ends of said tines along the longitudinal dimension of said fork as said reed-mode axis, said pliant coupling section being located to place said reed-mode axis at least one quarter of a tine length away from the center of gravity of said pair of tines measured in the direction of the longitudinal axis of said fork.

2. In a fork resonator comprising a fork having a pair of tines, a common tine-junction portion, a mounting portion secured to a base, and a pliant coupling section connecting said common tine-junction portion with said mounting portion so that said common tine-junction portion is vibratable in a reed-mode about a predetermined reed-mode axis; the improvement comprising a counterweight portion rigidly secured relative to said common tine-junction portion and causing the center of gravity of the combination of said tines, said common tine-junction portion and said counterweight portion to be displaced in the direction opposite to the ends of said tines at least as far as said pliant coupling section.

3. A fork resonator comprising a fork having a pair of tines, a common tine-junction portion, a mounting portion secured to a base, a pliant coupling section connecting said common tine-junction portion with said mounting portion so that said common tine-junction portion is vibratable in a reed-mode about a predetermined reed-mode axis, said common tine junction portion having a rigid extension extending away from said reed-mode axis in a direction opposite said tines having a mass and position such that the center of gravity of the combination of said tines, said common tine-junction portion and said extension is located substantially at least as far from the ends of said tines along the longitudinal dimension of said fork as said pliant coupling section.

4. In a tuning fork resonator comprising a fork having a pair of tines, a common tine-junction portion, a mounting portion secured to a base, and a pliant coupling section connecting said common tine-junction portion with said mounting portion so that said common tine-junction portion is resiliently supported for rotational motion about a predetermined pliant coupling section axis, said pliant coupling section being displaced by at least one-quarter tine-length from a line joining the centers of gravity of said tines, the improvement comprising a counterweight portion, rigid relative to said common tine-junction portion, causing the center of gravity of the combination of said tines, said common tine-junction portion and said counterweight portion to be approximately coincident with said pliant coupling section.

5. In a tuning fork resonator comprising a fork having a pair of tines, a common tine-junction portion, a mounting portion secured to a base, and a pliant coupling section connecting said common tine-junction portion with said mounting portion so that said common tine-junction portion is resiliently supported for rotational motion about a predetermined pliant coupling section axis, said pliant coupling section being displaced by at least one-quarter tine-length from a line joining the centers of gravity of said tines, the improvement comprising a counterweight portion, rigid relative to said common tine-junction portion, causing the center of gravity of the combination of said tines, said common tine-junction portion and said counterweight portion to be displaced from said pliant coupling section axis to the side opposite said tines.

6. A fork resonator comprising a fork having a pair of tines connected at their bases to a rigid common tine-junction portion, a mounting portion secured to a base, a pliant coupling section connecting said common tine-junction portion with said mounting portion so that said common tine-junction portion is resiliently supported for oscillatory motion about a predetermined pliant coupling section axis, said common tine-junction portion having a rigid extension extending away from said pliant coupling section axis in a direction opposite said tines having a mass and position such that the center of gravity of the combination of said tines, said common tine-junction portion and said extension is located approximately at the same position along the longitudinal dimension of said fork as said pliant coupling section.

7. A fork resonator comprising a fork having a pair of tines connected at their bases to a rigid common tine-junction portion, a mounting portion secured to a base, a pliant coupling section connecting said common tine-junction portion with said mounting portion so that said common tine-junction portion is resiliently supported for oscillatory motion about a predetermined pliant coupling section axis, said common tine-junction portion having a rigid extension extending away from said pliant coupling section axis in a direction opposite said tines having a mass and position such that the center of gravity of the combination of said tines, said common tine-junction portion and said extension is located near to the same position along the longitudinal dimension of said fork as said pliant coupling section but displaced to the side thereof opposite said tines.

8. Apparatus as claimed in claim 7 wherein said mounting portion is on the same side of said pliant coupling section as said tines.

9. Apparatus as claimed in claim 7 wherein said mounting portions is on the opposite side of said pliant coupling section from said tines.